(12) United States Patent
Kawakami et al.

(10) Patent No.: US 8,746,105 B2
(45) Date of Patent: Jun. 10, 2014

(54) BICYCLE OPERATING DEVICE

(75) Inventors: Tatsuya Kawakami, Sakai (JP); Yoshimitsu Miki, Sakai (JP); Kazutaka Fukao, Sakai (JP); Takafumi Nishino, Sakai (JP)

(73) Assignee: Shimano Inc., Osaka (JP)

( * ) Notice: Subject to any disclaimer, the term of this patent is extended or adjusted under 35 U.S.C. 154(b) by 15 days.

(21) Appl. No.: 13/404,295

(22) Filed: Feb. 24, 2012

(65) Prior Publication Data

US 2013/0220056 A1 Aug. 29, 2013

(51) Int. Cl.
*F16C 1/12* (2006.01)

(52) U.S. Cl.
USPC ...................................................... 74/501.6

(58) Field of Classification Search
USPC .................................. 74/500.5, 501.6, 502.2
See application file for complete search history.

(56) References Cited

U.S. PATENT DOCUMENTS

| | | | |
|---|---|---|---|
| 6,450,060 B1 * | 9/2002 | Shahana | 74/502.2 |
| 7,000,496 B2 | 2/2006 | Wessel et al. | |
| 7,146,874 B2 | 12/2006 | Shahana et al. | |
| 7,194,931 B2 * | 3/2007 | Wessel | 74/577 M |
| 7,878,089 B2 | 2/2011 | McLaughlin et al. | |
| 2003/0126940 A1 | 7/2003 | Kawakami | |
| 2003/0221507 A1 * | 12/2003 | Wessel et al. | 74/502.2 |
| 2006/0053940 A1 | 3/2006 | McLaughlin et al. | |
| 2006/0096404 A1 * | 5/2006 | Wessel et al. | 74/501.6 |
| 2010/0071499 A1 * | 3/2010 | Weiss | 74/502.2 |

FOREIGN PATENT DOCUMENTS

| | | |
|---|---|---|
| EP | 1 134 158 B1 | 2/2006 |
| EP | 1 366 981 B1 | 1/2010 |

* cited by examiner

*Primary Examiner* — Vicky Johnson
(74) *Attorney, Agent, or Firm* — Global IP Counselors

(57) ABSTRACT

A bicycle operating device includes a housing, a control member, a linearly moving member, a transmission, a user operating member and an intermediate element. The control member rotates on the housing for controlling a control cable. The linearly moving member moves on the housing for linear displacement between first and second positions. The transmission operatively couples the linearly moving member to the control member. The transmission converts the linear displacement of the linearly moving member from the first position to the second position into a rotation of the control member toward a first rotational direction. The user operating member is movably mounted to the housing. The intermediate element moves relative to the linearly moving member and the user operating member to transmit a movement of the user operating member to the linearly moving member for moving the linearly moving member from the first position to the second position.

7 Claims, 13 Drawing Sheets

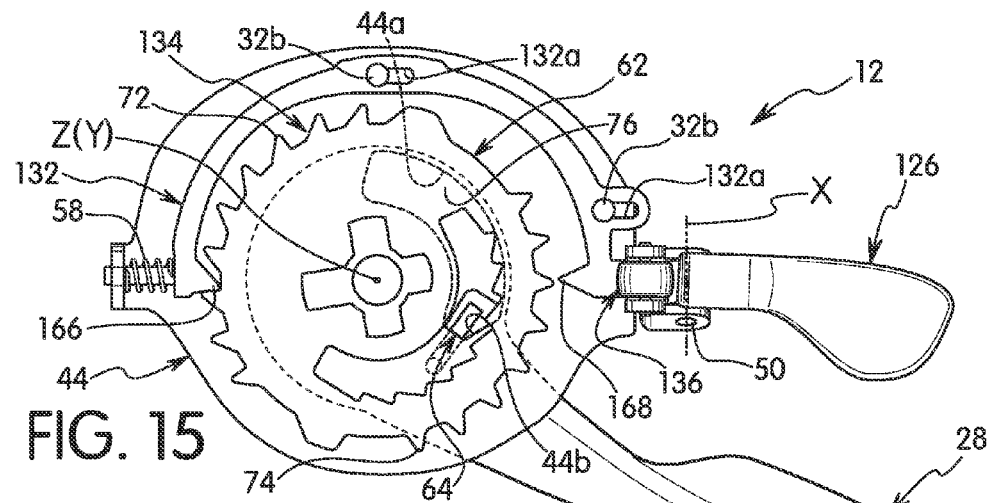
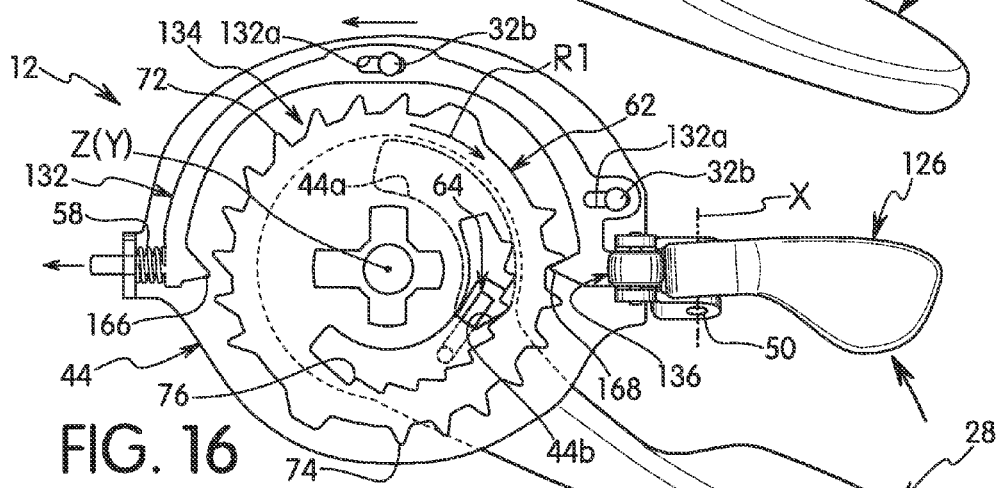
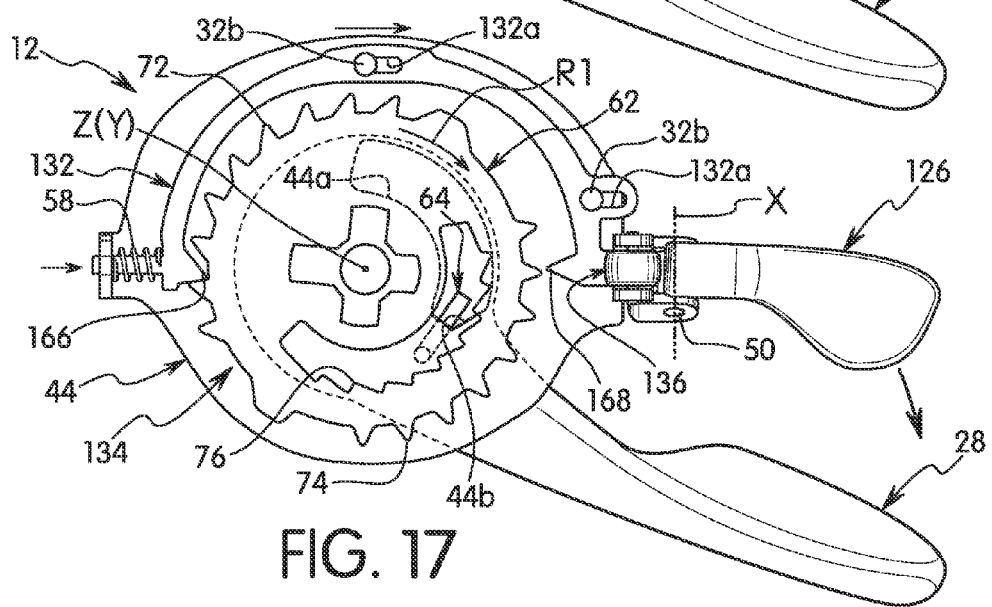

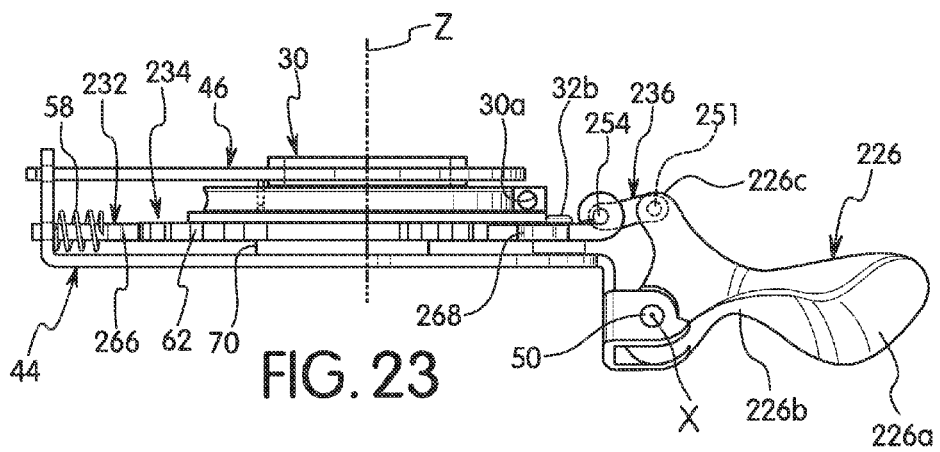
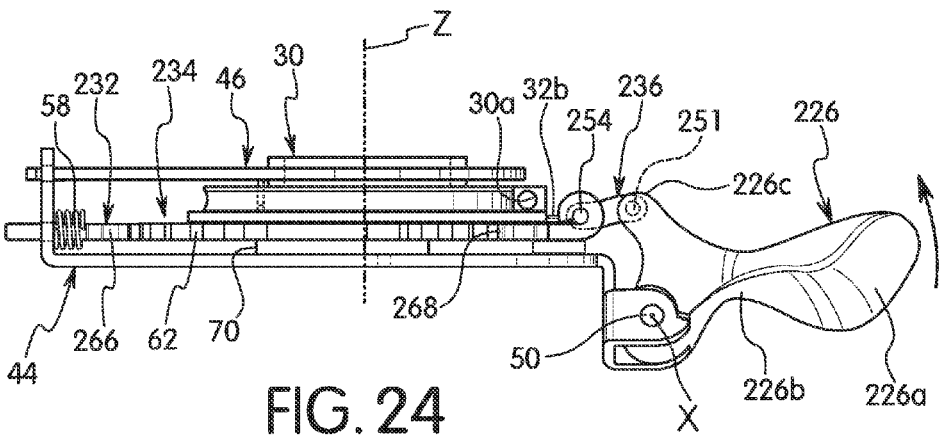

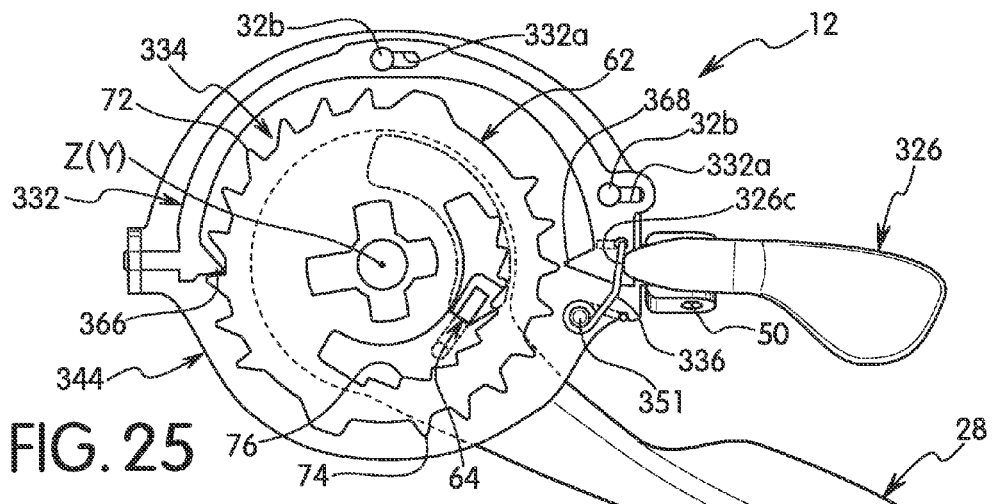
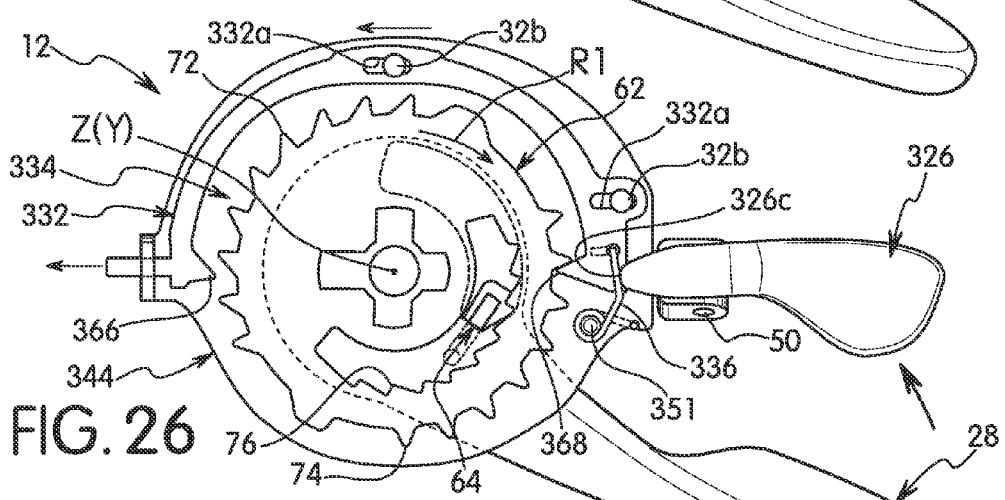
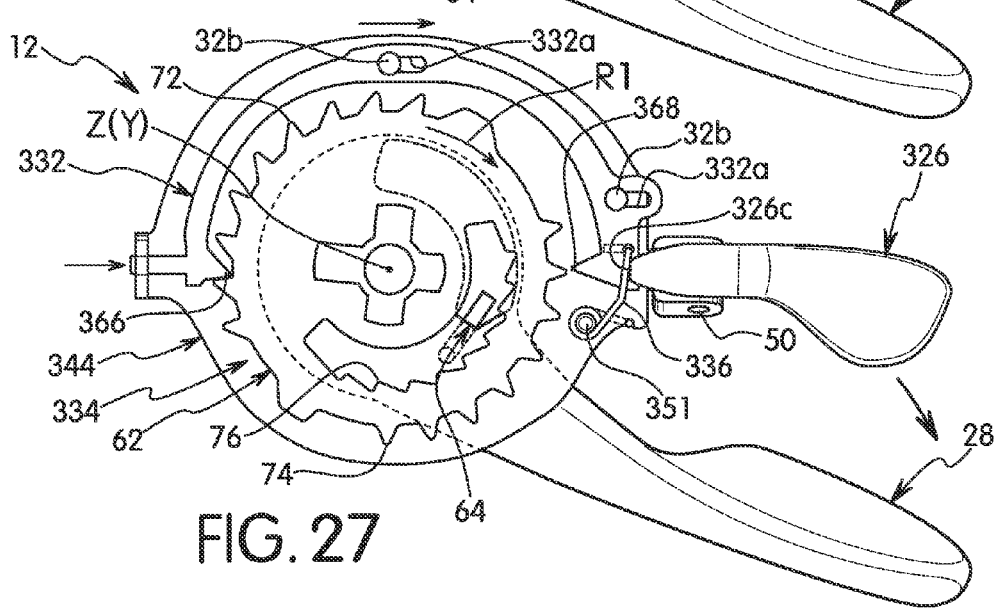

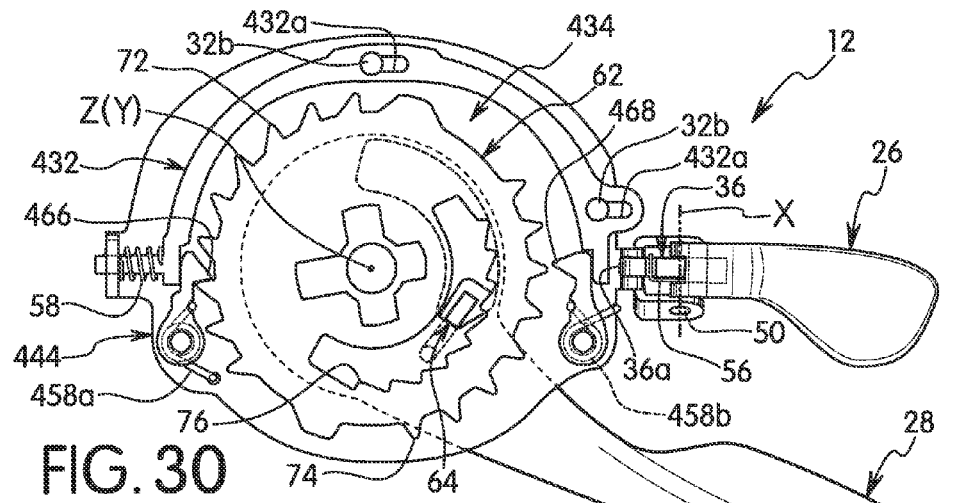
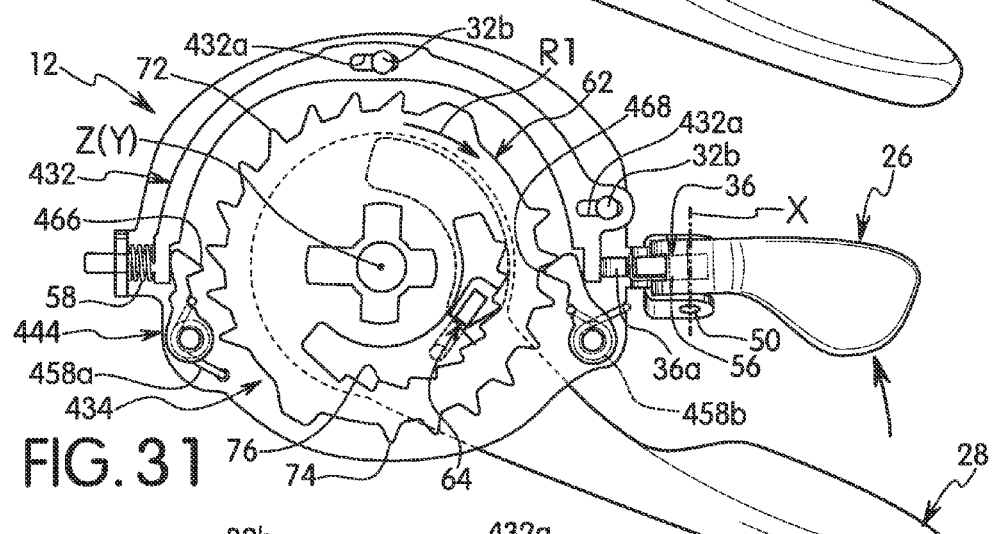
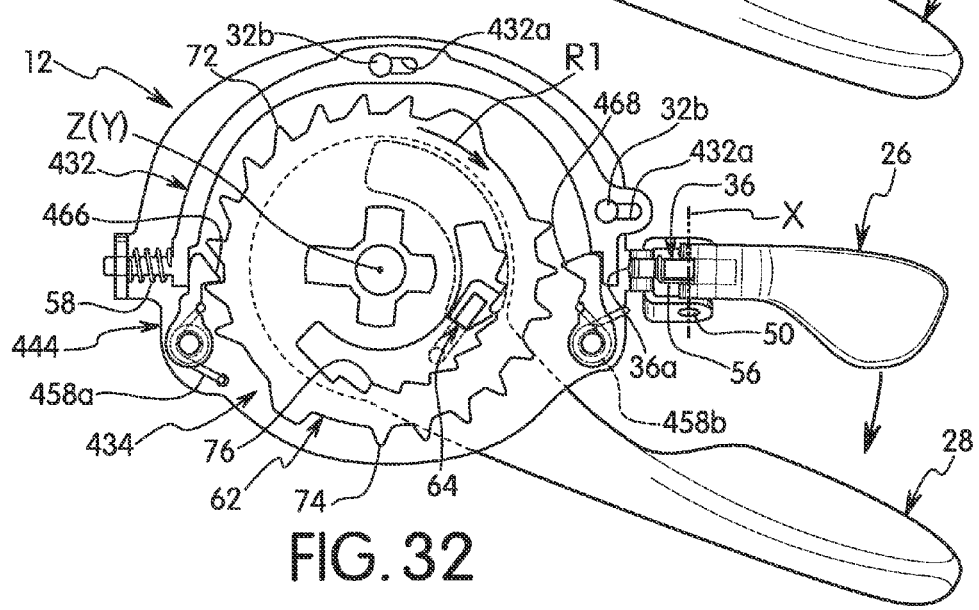

BICYCLE OPERATING DEVICE

BACKGROUND

1. Field of the Invention

This invention generally relates to a bicycle operating device. More specifically, the present invention relates to a bicycle operating device for controlling a control cable.

2. Background Information

Most bicycles are provided with a drive train having multiple gears that allows the rider to select a particular gear for a particular situation. A bicycle operating device is usually provided for the rider to manually change gears of a bicycle transmission. Many types of bicycle operating devices have been developed to control the actuation of bicycle transmissions. Such bicycle operating devices are often called shift control devices or merely shifters. The shifters often take the form of levers or cylindrical twist-grips that rotate to a different position for each gear position. The shifters typically pull and release an inner wire of a shift control cable in order to shift gears. One example of a conventional shifter for a bicycle is disclosed in U.S. Pat. No. 7,146,874 (assigned to Shimano, Inc.).

SUMMARY

One aspect is to provide a bicycle operating device that is relatively easy to use.

In view of the state of the known technology, a bicycle operating device comprises a housing, a control member, a linearly moving member, a transmission, a user operating member and an intermediate element. The control member is rotatably disposed on the housing about an axis for controlling a control cable. The linearly moving member is movably disposed on the housing for linear displacement between a first position and a second position. The transmission is operatively coupled between the linearly moving member and the control member. The transmission converts the linear displacement of the linearly moving member from the first position to the second position into a rotation of the control member toward a first rotational direction about the axis. The user operating member is movably mounted to the housing. The intermediate element is movably mounted relative to the linearly moving member and the user operating member to transmit a movement of the user operating member to the linearly moving member for moving the linearly moving member from the first position to the second position.

These and other objects, features, aspects and advantages of the bicycle operating device disclosed herein will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 15 is a top plan view of selected parts of the right bicycle shifter illustrated in FIGS. 1 to 3 together with a modified linearly moving member and a modified intermediate element in accordance with a first modification, and showing the first and second operating members in their rest positions;

FIG. 16 is a top plan view of the selected parts of the right bicycle shifter illustrated in FIG. 15, and showing the second operating member in the rest position and the first operating member moved to a non-rest position for performing a shifting (releasing) actuation;

FIG. 17 is a top plan view of the selected parts of the right bicycle shifter illustrated in FIGS. 15 and 16, showing the first operating member returned to its rest position to complete the shifting (releasing) actuation that was started in FIG. 16;

FIG. 23 is a side elevational view of selected parts of the right bicycle shifter illustrated in FIGS. 20 to 22, and showing the first operating members in its rest position;

FIG. 24 is a side elevational view of selected parts of the right bicycle shifter illustrated in FIGS. 20 to 23, and showing the first operating member moved to a non-rest position for performing a shifting (releasing) actuation;

FIG. 25 is a top plan view of selected parts of the right bicycle shifter illustrated in FIGS. 1 to 3 together with a modified linearly moving member and a modified intermediate element in accordance with a third modification, and showing the first and second operating members in their rest positions;

FIG. 26 is a top plan view of the selected parts of the right bicycle shifter illustrated in FIG. 25, and showing the second operating member in the rest position and the first operating member moved to a non-rest position for performing a shifting (releasing) actuation;

FIG. 27 is a top plan view of the selected parts of the right bicycle shifter illustrated in FIGS. 25 and 26, showing the first operating member returned to its rest position to complete the shifting (releasing) actuation that was started in FIG. 26;

FIG. 30 is a top plan view of selected parts of the right bicycle shifter illustrated in FIGS. 1 to 3 together with a modified linearly moving member, a separate positioning tooth and a separate maintaining tooth in accordance with a fourth modification, and showing the first and second operating members in their rest positions;

FIG. 31 is a top plan view of the selected parts of the right bicycle shifter illustrated in FIG. 30, and showing the second operating member in the rest position and the first operating member moved to a non-rest position for performing a shifting (releasing) actuation; and FIG. 32 is a top plan view of the selected parts of the right bicycle shifter illustrated in FIGS. 30 and 31, showing the first operating member returned to its rest position to complete the shifting (releasing) actuation that was started in FIG. 31.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
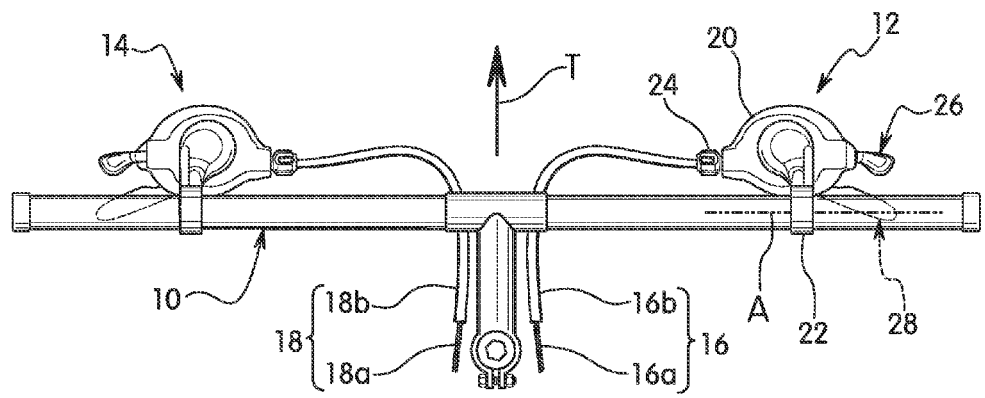
FIG. 1 is a top plan view of a bicycle handlebar that having two bicycle operating devices in the form of bicycle gear shifters in accordance with one illustrative embodiment.

Referring initially to FIG. 1, a bicycle handlebar 10 is illustrated that is provided with a right bicycle operating device 12 and a left bicycle operating device 14 in accordance with one illustrative embodiment. The bicycle operating devices 12 and 14 are in the form of bicycle gear shifters. Thus, the bicycle operating devices 12 and 14 will be referred to hereinafter as the bicycle shifters 12 and 14.

One of the bicycle shifters 12 and 14 is operatively coupled to a rear gear changing device (not shown) via a first shift control cable 16, while the other one of the bicycle shifters 12 and 14 is operatively coupled to a front gear changing device (not shown) via a second shift control cable 18. The gear changing devices are part of a conventional bicycle driving system that is used to shift a bicycle chain for changing speeds of a drive train (not shown) in a relatively conventional manner. Thus, the gear changing devices will not be shown or described herein.

Preferably, the shift control cables 16 and 18 are conventional bicycle operating cables that have an outer case covering an inner wire. In other words, each of the shift control cables 16 and 18 is a Bowden type cable that basically includes an inner wire slidably received within an outer case. For example, as seen in FIG. 1, the shift control cable 16 has an inner wire 16a with an outer case 16b covering the inner wire 16a, while the shift control cable 18 has an inner wire 18a with an outer case 18b covering the inner wire 18a.

Also in the illustrated embodiment, the bicycle shifters 12 and 14 are essentially identical in actuation, except that they are mirror images of each other, and they may have a different number of shift actuations. In other words, the bicycle shifter 14 is identical to the bicycle shifter 12, except for the bicycle shifter 14 has been modified to be a mirror image and the number of gears that can be shifted has been changed. Thus, for the sake of brevity, only the bicycle shifter 12 will be discussed and illustrated herein.

Figure 2:
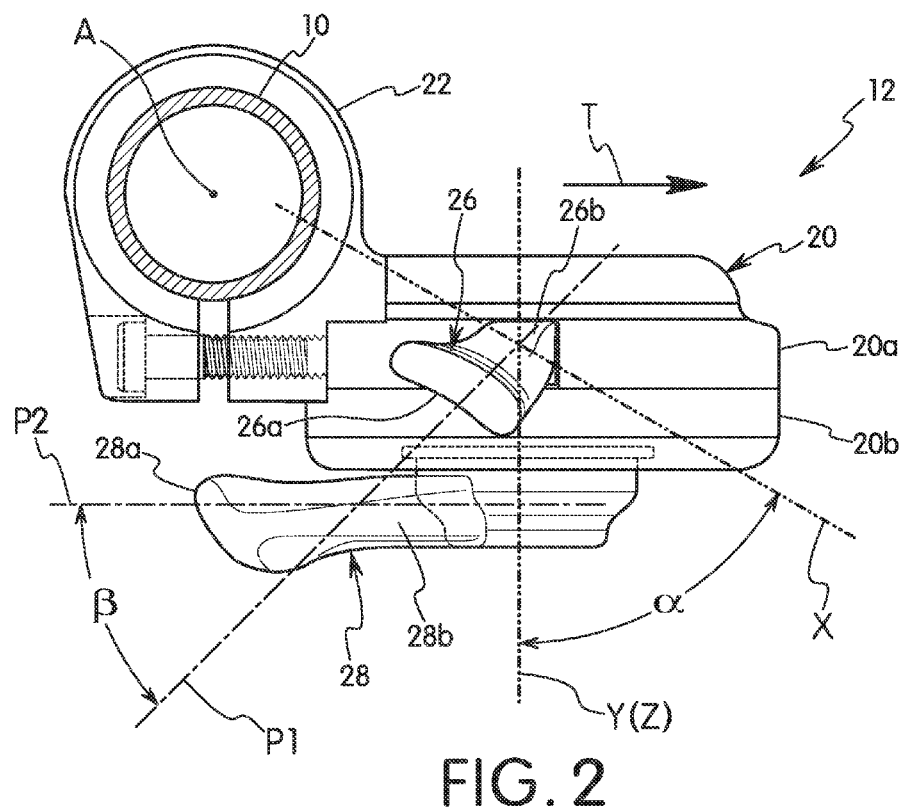
FIG. 2 is a side elevational view of the right bicycle shifter illustrated in FIG. 1 as viewed along a direction parallel to a handlebar mounting axis.

As seen in FIGS. 1 and 2, the bicycle shifter 12 includes a shifter housing 20 that houses a shifting mechanism as explained below. The housing 20 has a rigid upper shell 20a and a rigid lower shell 20b that are fastened together in a conventional manner (e.g., a snap-fit, a plurality of screws, etc.). Alternatively, the housing 20 may be constructed of several pieces. The housing 20 includes a tubular handlebar mounting clamp 22 that is configured to be mounted to the handlebar 10. In this way, the clamp 22 fixedly supports the bicycle shifter 12 on the bicycle handlebar 10. In the illustrated embodiment, the clamp 22 is integrally formed with a rigid upper shell of the housing 20. However, the clamp 22. can be a separate member that is fastened to the housing 20. The handlebar mounting clamp 22 defines a handlebar mounting axis A. As seen in FIG. 1, the housing 20 also includes a conventional cable adjustment device 24 that is threaded into the housing 20 for adjusting a relative axial position of the outer case 16b relative the inner wire 16a.

The bicycle shifter 12 further includes a first user operating member 26 that is movably mounted to the housing 20 for pivotal movement about a pivot axis X (hereinafter "first axis X"). The motion of the first user operating member 26 defines a first motion plane P1 that is perpendicular to the first axis X. The bicycle shifter 12 further includes a second user operating member 28 that is movably mounted to the housing 20 for pivotal movement about a pivot axis Y (hereinafter "second axis Y"). The motion of the second user operating member 28 defines a second motion plane P2 that is perpendicular to the second axis Y. The first and second user operating members 26 and 28 are trigger type operating members or levers that return to a single rest position after being actuated.

Figure 3:
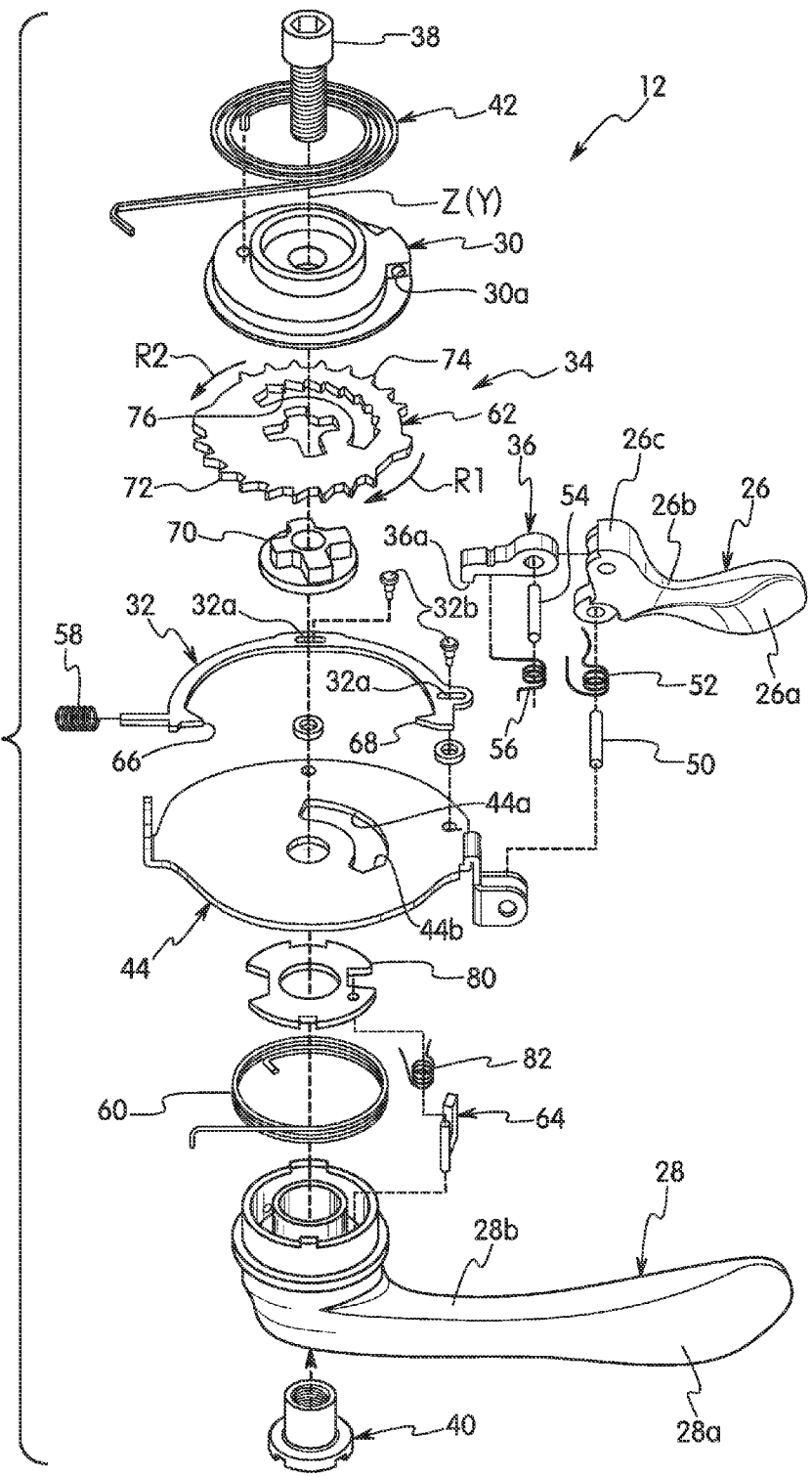
FIG. 3 is an exploded perspective view of selected parts of the right bicycle shifter illustrated in FIGS. 1 and 2.

As seen in FIG. 3, the bicycle shifter 12 further includes a control member 30, a linearly moving member 32 and a transmission 34. The control member 30, the linearly moving member 32 and the transmission 34 form the shifting mechanism that is all disposed within the housing 20. The first and second user operating members 26 and 28 are operatively coupled to the control member 30 to rotate the control member 30 about a rotational axis Z (hereinafter "third axis Z"). In the illustrated embodiment, an intermediate element 36 is disposed between the first user operating member 26 and the linearly moving member 32 for transmitting a movement of the first user operating member 26 to the linearly moving member 32 for performing a shifting operation. The control member 30 rotates on the housing 20 for pulling and releasing the inner wire 16a with respect to the housing 20.

In the bicycle shifter 12, as seen in FIG. 3, the control member 30 is a cable spool or a wire takeup member that has a cable attachment structure 30a (e.g., an attachment opening or notch) formed at the peripheral edge of the control member 30 for directly attaching the nipple of the inner wire 16a to the control member 30. In this way, the inner wire 16a has one end attached to the control member 30. The control member 30 is rotatably mounted on a mounting bolt 38 that defines the third axis Z.

Referring back to FIG. 2, the first axis X of the first operating member 26 is preferably tilted downward in the forward or travel direction T such that the first user operating member 26 pivots simultaneously forward and upward when actuated from its rest position to an actuated position for performing a shifting (releasing) actuation. On the other hand, the second axis Y of the second user operating member 28 preferably extends coaxially with the third axis Z of the control member 30. Preferably, the second axis Y of the second user operating member 28 is approximately vertical when installed. The first and second axes X and Y form an angle α therebetween in the range of twenty degrees to seventy degrees such that the first and second motion planes P1 and P2 of the first and second user operating members 26 and 28 also form an angle β therebetween in the range of twenty degrees to seventy degrees. In a preferred embodiment, the first and second axes X and Y are arranged such that the angles α and β become approximately sixty degrees as shown in FIG. 2.

The first and second user operating members 26 and 28 are preferably disposed below the handlebar 10 such that the first and second user operating members 26 and 28 include first and second user contact surfaces 26a and 28a, respectively, which are arranged to be operated by a rider's thumb. The first user contact surface 26a of the first user operating member 26 is shaped and sized differently than the second user contact surface 28a of the second user operating member 28. The second user contact surface 28a of the second user operating member 28 is preferably slightly convex whereas the first user contact surface 26a of the first user operating member 26 is slightly concave. The incline allows the thumb to deliberately slip off the contact surface, resulting in a rapid shifting operation.

The first user operating member 26 also includes a first pivot arm 26b and an operating part 26c for attaching the intermediate element 36 (FIG. 3). The first user contact surface 26a is disposed at a free end of the first pivot arm 26b of the first user operating member 26. Thus, the first user contact surface 26a is spaced from the first axis X. The first user operating member 26 is preferably offset about one thumb width from the second user operating member 28 in the travel direction, and is disposed above the second user operating member 28. The first user operating member 26 pivots about the first axis X so as to move along the first motion plane P1. The first user contact surface 26a of the first user operating member 26 is disposed in front of the handlebar 10.

Figure 4:
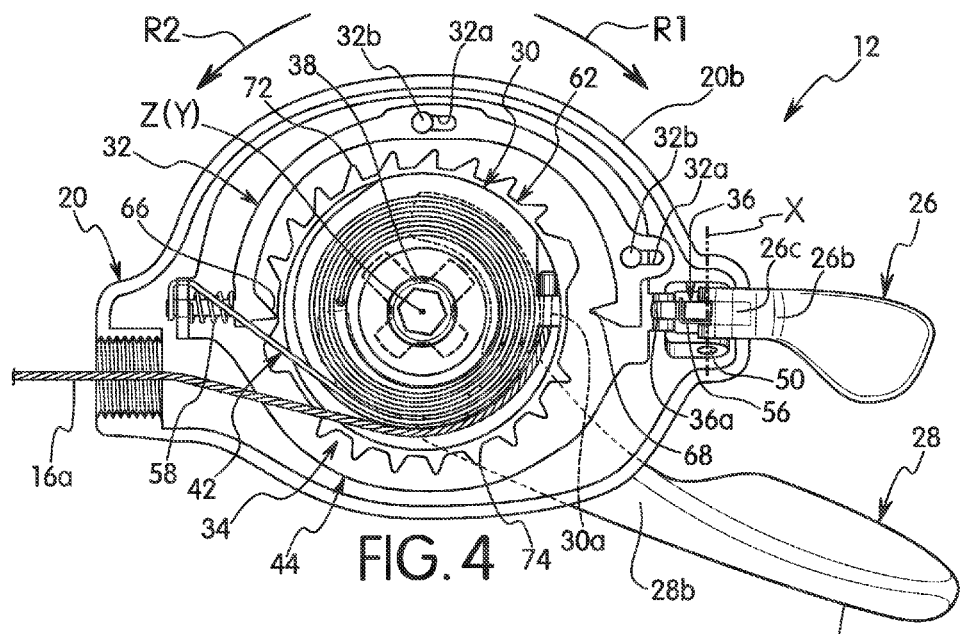
FIG. 4 is a top plan view of the right bicycle shifter illustrated in FIGS. 1 to 3, with the upper shell removed.

The second user operating member 28 includes a second pivot arm 28b. The second user contact surface 28a is disposed at a free end of the second pivot arm 28b of the second user operating member 28. Thus, the second user contact surface 28a is spaced from the second axis Y. As seen in FIG. 4, the second pivot arm 28b of the second user operating member 28 is longer than the first pivot arm 26b of the first user operating member 26. The second user operating member 28 pivots about the second axis Y so as to move along the second motion plane P2. The second motion plane P2 is substantially in the travel direction T. The second user contact surface 28a of the second user operating member 28 is disposed approximately vertically below the handlebar mounting axis A of the clamp 22.

The actuation of the first user operating member 26 causes the control member 30 to rotate in a first rotational direction R1 (FIG. 4: clockwise as viewed looking down along the third axis Z). On the other hand, the actuation of the second user operating member 28 causes the control member 30 to rotate in a second rotational direction R2 (FIG. 4: counterclockwise as viewed looking down along the third axis Z). A biasing element 42 (e.g., a torsion spring) biases the control member 30 in the first rotational direction R1 on the mounting bolt 38. A nut 40 is threaded onto the mounting bolt 38 to movably mount both the second user operating member 28 and the control member 30 to the lower shell 20b of the housing 20 in a conventional manner.

With this arrangement, the third axis Z is coincident with the second axis Y of the second user operating member 28. Thus, the second axis Y is coaxial with the third axis Z such that the second user operating member 28 and the control member 30 rotate around the same axis. The bicycle shifter 12 is provided with a stationary support plate 44 that pivotally supports the first user operating member 26 relative to the housing 20. Thus, the housing 20 and the support plate 44 constitute a fixed member of the bicycle shifter 12.

Figure 10:
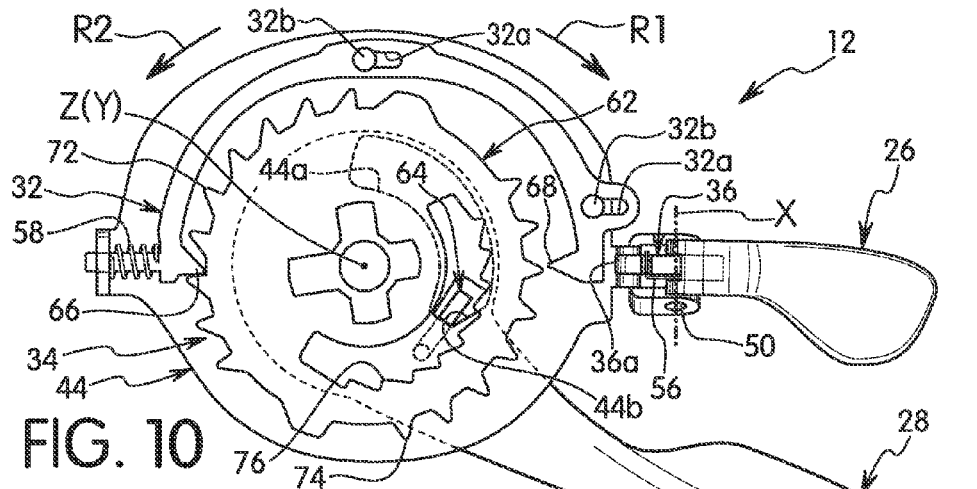
FIG. 10 is a top plan view of selected parts of the right bicycle shifter illustrated in FIGS. 1 to 3, showing the first and second operating members in their rest positions.
Figure 11:
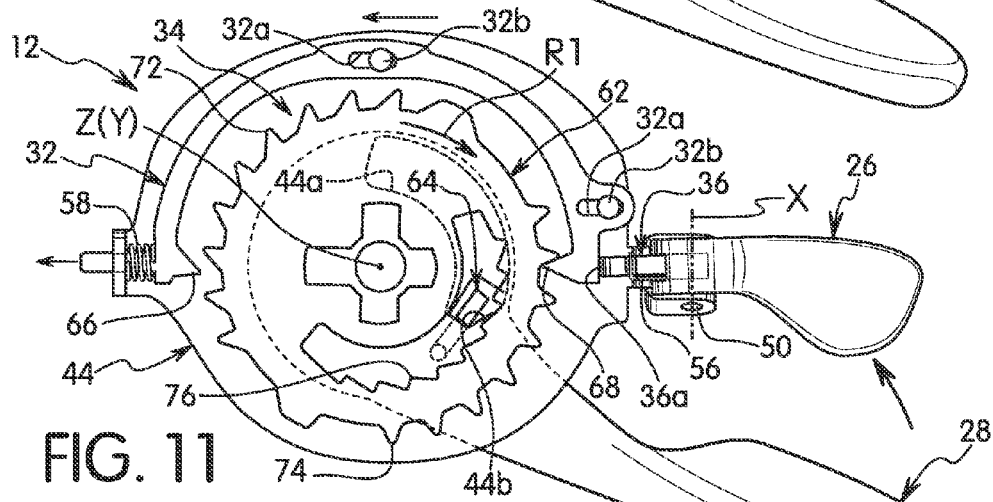
FIG. 11 is a top plan view of the selected parts of the right bicycle shifter illustrated in FIG. 10, showing the second operating member in the rest position and the first operating member moved to a non-rest position for performing a shifting (releasing) actuation.
Figure 13:
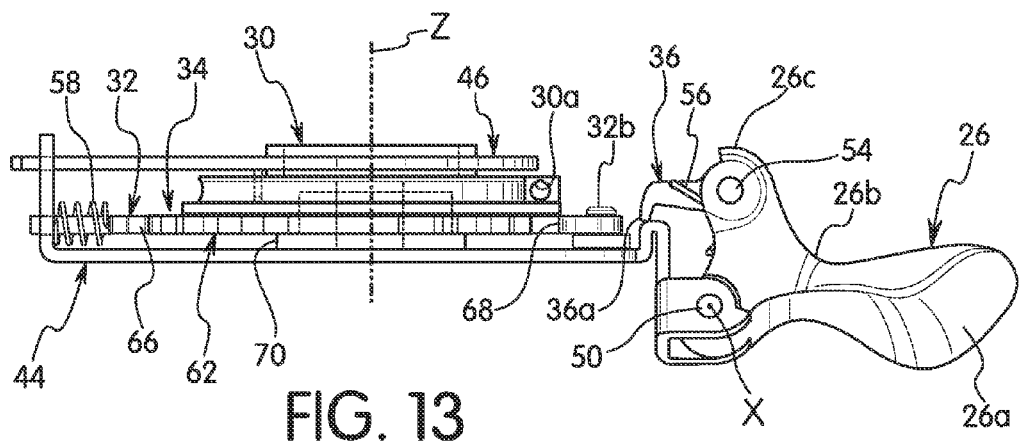
FIG. 13 is a side elevational view of selected parts of the right bicycle shifter illustrated in FIGS. 1 to 3, showing the first operating members in its rest position.
Figure 14:
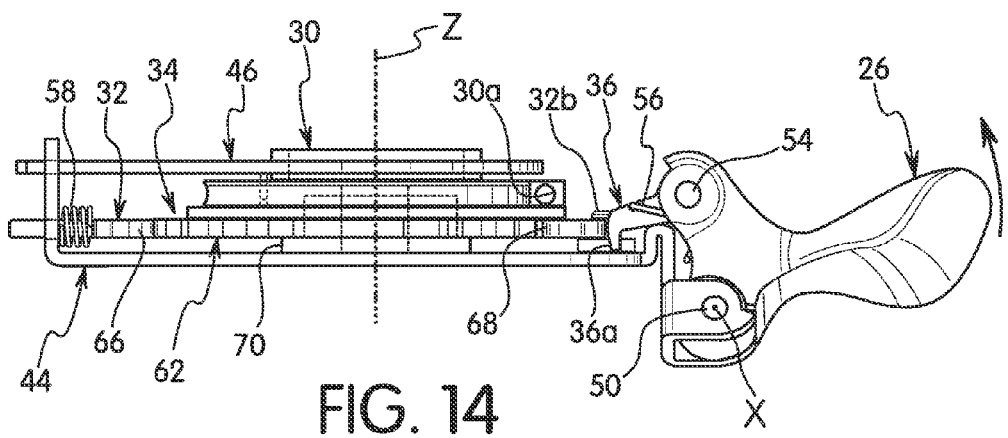
FIG. 14 is a side elevational view of the selected parts of the right bicycle shifter illustrated in FIG. 13, showing the first operating member moved to a non-rest position for performing a shifting (releasing) actuation.
Figure 18:
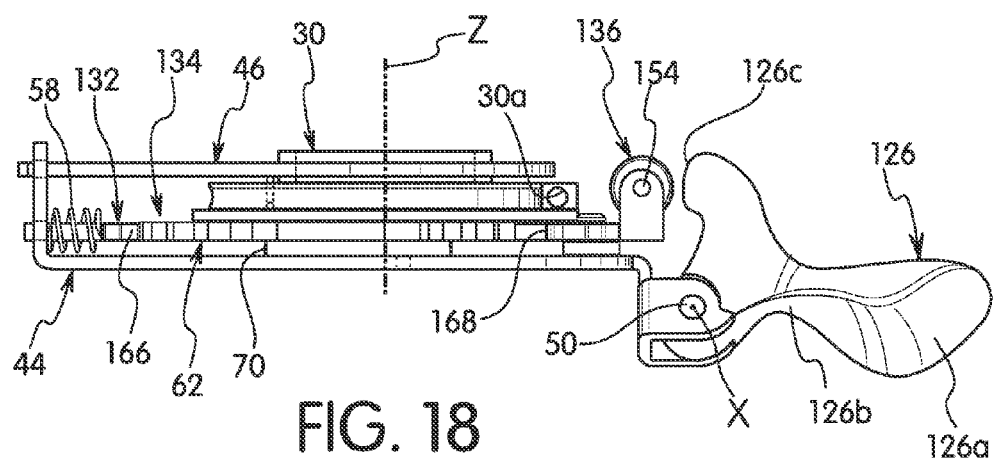
FIG. 18 is a side elevational view of selected parts of the right bicycle shifter illustrated in FIGS. 15 to 17, and showing the first operating members in its rest position.
Figure 19:
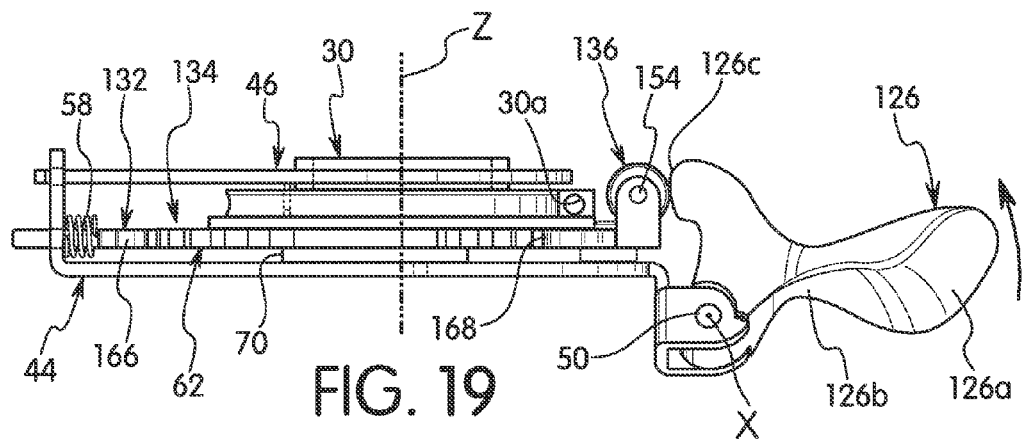
FIG. 19 is a side elevational view of selected parts of the right bicycle shifter illustrated in FIGS. 15 to 18, and showing the first operating member moved to a non-rest position for performing a shifting (releasing) actuation.
Figure 20:
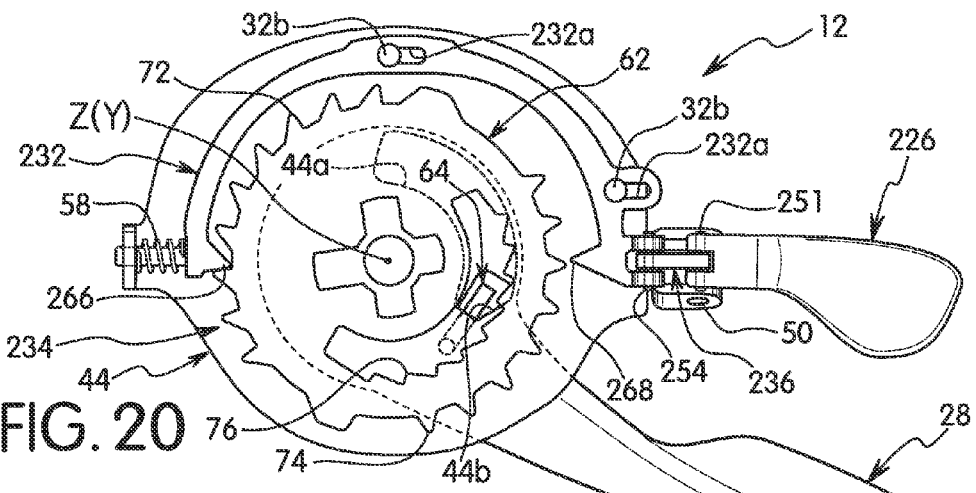
FIG. 20 is a top plan view of selected parts of the right bicycle shifter illustrated in FIGS. 1 to 3 together with a modified linearly moving member and a modified intermediate element in accordance with a second modification, and showing the first and second operating members in their rest positions.
Figure 21:
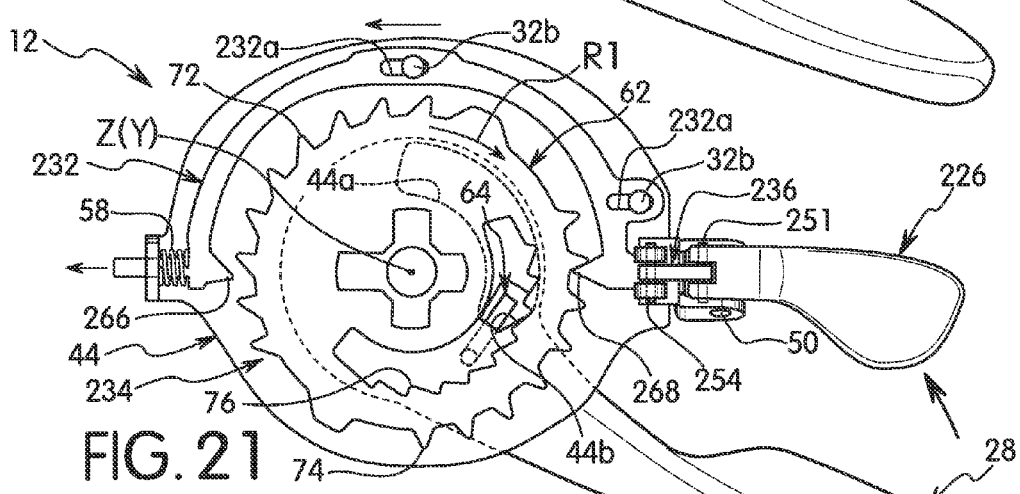
FIG. 21 is a top plan view of the selected parts of the right bicycle shifter illustrated in FIG. 20, and showing the second operating member in the rest position and the first operating member moved to a non-rest position for performing a shifting (releasing) actuation.
Figure 22:
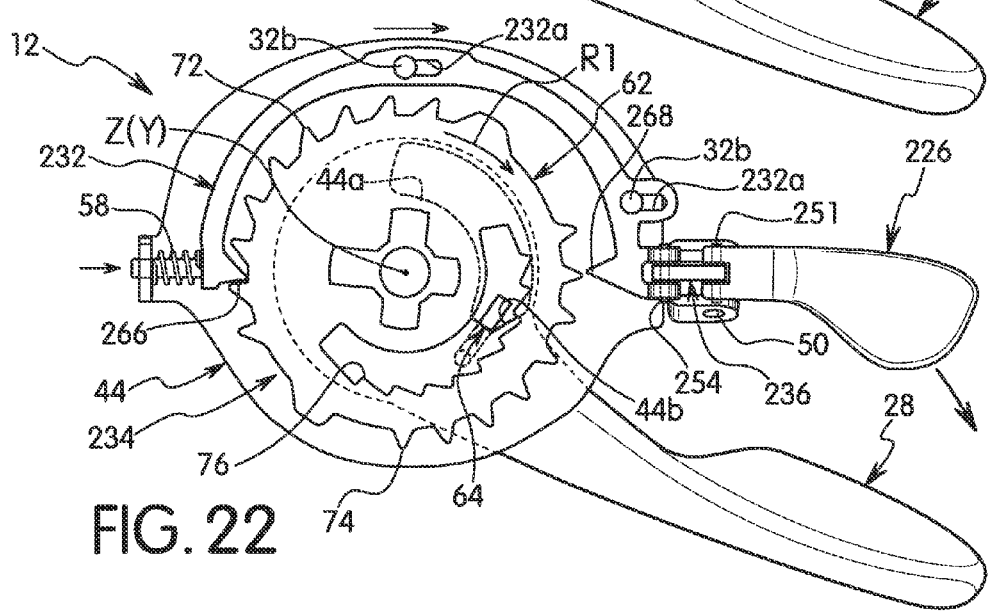
FIG. 22 is a top plan view of the selected parts of the right bicycle shifter illustrated in FIGS. 20 and 21, showing the first operating member returned to its rest position to complete the shifting (releasing) actuation that was started in FIG. 21.
Figure 28:
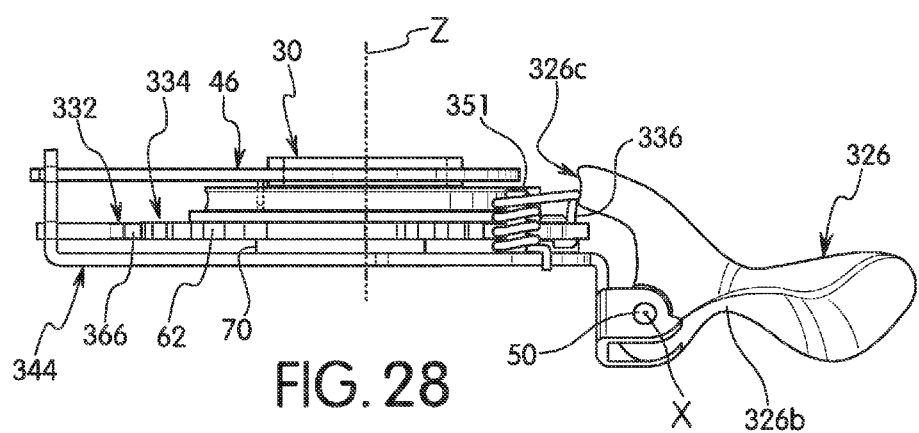
FIG. 28 is a side elevational view of selected parts of the right bicycle shifter illustrated in FIGS. 25 to 27, and showing the first operating members in its rest position.
Figure 29:
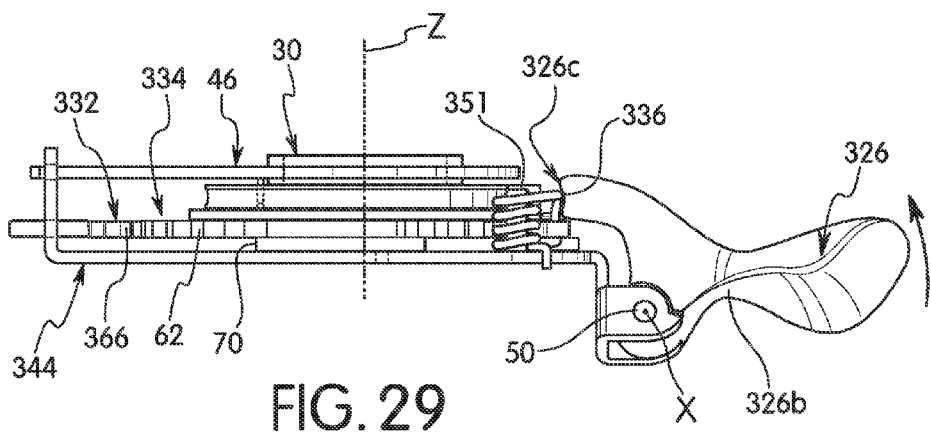
FIG. 29 is a side elevational view of selected parts of the right bicycle shifter illustrated in FIGS. 25 to 28, and showing the first operating member moved to a non-rest position for performing a shifting (releasing) actuation.

In the illustrated embodiment, the first user operating member 26 pivotally attached to the stationary support plate 44 by a pivot pin 50 for movement between a rest position (FIGS. 7 to 10, 12 and 13) and an actuated position (FIGS. 11 and 14). A biasing element 52 (e.g., a torsion spring) is provided on the pivot pin 50 to bias the first user operating member 26 towards the rest position. Thus, the first user operating member 26 is a trigger lever that is biased to a rest position after being actuated.

Figure 12:
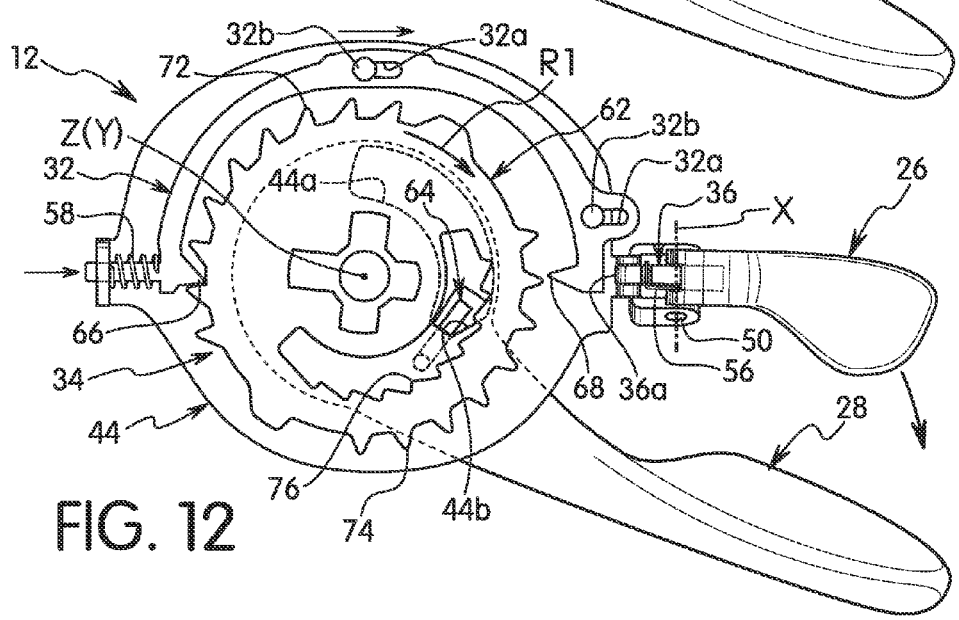
FIG. 12 is a top plan view of the selected parts of the right bicycle shifter illustrated in FIGS. 10 and 11, showing the first operating member returned to its rest position to complete the shifting (releasing) actuation that was started in FIG. 11.

Referring to FIGS. 3 and 10 to 14, in the illustrated embodiment, the intermediate element 36 is disposed on the first user operating member 26 such that the intermediate element 36 moves the linearly moving member 32 in response to movement of the first user operating member 26 from the rest position to the actuated position. Here, the intermediate element 36 is a pivoting member that is pivotally coupled to the operating part 26c of the first user operating member 26 by a pivot pin 54. A biasing element 56 (e.g., a torsion spring) is provided on the pivot pin 54 to bias the intermediate element 36 (i.e., the pivoting member) towards engagement with the stationary support plate 44 as best seen in FIGS. 13 and 14.

Upon actuation of the first user operating member 26, the intermediate element 36 (i.e., the pivoting member) moves into contact with the linearly moving member 32 and then linearly moves (i.e., pushes) the linearly moving member 32 from a first position or rest position to a second position or actuated position. More specifically, the intermediate element 36 (i.e., the pivoting member) has a contact tooth 36a that temporally contacts the linearly moving member 32 during movement of the linearly moving member 32 from the first position to the second position. Thus, the intermediate element 36 initially moves relative to the linearly moving member 32 in response to actuation of the first user operating member 26, and then contacts the linearly moving member 32 to transmit the movement of the first user operating member 26 to the linearly moving member 32 for moving the linearly moving member 32 from the first position to the second position. As explained below, a shift actuation is performed by the movement of the linearly moving member 32 from the first position to the second position and then back to the first position.

Figure 5:
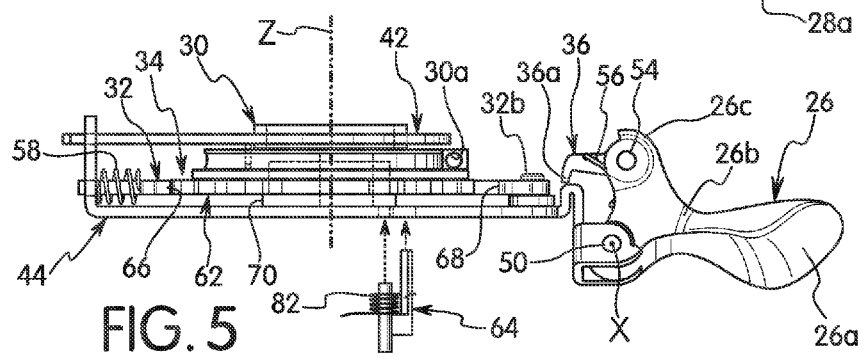
FIG. 5 is a side elevational view of selected parts of the right bicycle shifter illustrated in FIGS. 1 to 3 with a part of the pulling mechanism exploded downwardly from the transmission.
Figure 6:
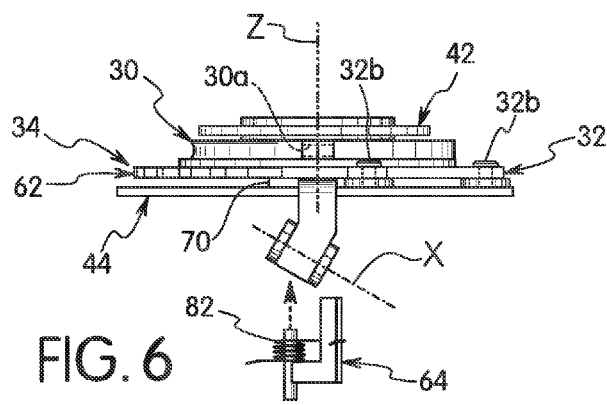
FIG. 6 is another side elevational view of selected parts of the right bicycle shifter illustrated in FIGS. 1 to 3 with a part of the pulling mechanism exploded downwardly from the transmission.

As seen in FIGS. 4 and 5, the linearly moving member 32 is bias to the first position or rest position by a biasing element 58 (e.g., a compression spring). The biasing element 58 is operatively disposed between the linearly moving member 32 and the stationary support plate 44 to bias the linearly moving member 32 towards the first position or rest position. It will be apparent from this disclosure that the biasing element 58 is not limited to the illustrated arrangement. Rather, a wide variety of biasing arrangements are possible for biasing the linearly moving member 32 to the first position.

As seen in FIGS. 7 to 12, the linearly moving member 32 is a C or U-shaped member that is mounted to the stationary support plate 44 for linear movement. The linearly moving member 32 has a pair of slots 32a and a pair of mounting pins 32b for controlling the linear movement of the linearly moving member 32 with respect to the stationary support plate 44. In particular, the mounting pins 32b are fixed to the stationary support plate 44. Each of the slots 32a has one of the mounting pins 32b extending therethrough so the linearly moving member 32 can move on the stationary support plate 44 in a substantially linear fashion.

As best seen in FIG. 4, the inner wire 16a is fixed to the cable attachment structure 30a of the control member 30 such that the inner wire 16a can be released from the housing 20 by actuation of the first user operating member 26 or pulled into the housing 20 by actuation of the second user operating member 28. Specifically, actuation of the first user operating member 26 causes the inner wire 16a to be released, and thus unwound from the peripheral edge of the control member 30. The control member 30 rotates in the first rotational direction R1 during a cable releasing operation by the first user operating member 26. On the other hand, the inner wire 16a is pulled, and thus wound on the peripheral edge of the control member 30 by actuation of the second user operating member 28. Thus, the first user operating member 26 constitutes a release lever, while the second user operating member 28 constitutes a pull lever. The control member 30 rotates in the second rotational direction R2, which is opposite to the first rotational direction R1, during a cable pulling operation by the second user operating member 28. The second user operating member 28 is biased towards a rest position by a biasing element 60 (FIG. 3) that is operatively coupled between the housing 20 and the second user operating member 28. In the illustrated embodiments, the biasing element 60 is a torsion spring that has one end coupled to the lower shell 20b of the housing 20 and the other end coupled to the second user operating member 28. Thus, the second user operating member 28 is a trigger lever that is biased towards the rest position after being actuated.

Referring again to FIG. 3, the transmission 34 of the shifting mechanism will now be discussed in more detail. Basically, the transmission 34 operatively couples the linearly moving member 32 to the control member 30 such that selective actuation of the first and second user operating members 26 and 28 causes the inner wire 16a to be either released from the housing 20 or pulled into the housing 20. In other words, the transmission 34 controls the amount of rotation of the control member 30 so that a predetermined amount of the inner wire 16a is either released from the housing 20 or pulled into the housing 20 by operating the first and second user operating members 26 and 28. When the first user operating member 26 is actuated, the linearly moving member 32 is linearly displaced from the first position to the second position such that the transmission 34 converts the linear displacement of the linearly moving member 32 from the first position to the second position into a rotation of the control member 30 toward the first rotational direction R1 about the third axis Z.

As seen in FIG. 3, the transmission 34 basically includes a ratchet 62, a pull pawl 64, a positioning tooth 66 and a maintaining tooth 68. In the illustrated embodiment, the positioning tooth 66 and the maintaining tooth 68 are integrally provided on the linearly moving member 32. However, the positioning tooth 66 and the maintaining tooth 68 can be separate members from the linearly moving member 32 as in the last illustrated modification, which is discussed below.

The ratchet 62 is a generally a flat rigid plate or disk element that is fixed to the control member 30 to rotate with the control member 30 about the third axis Z. In the illustrated embodiment, a securing washer 70 is used to fix the control member 30 and the ratchet 62 together. The securing washer 70 also acts as a spacer for maintaining the control member 30 in the same plane as the linearly moving member 32. The securing washer 70 has a non-circular protrusion that fits into a non-circular opening in the ratchet 62 and a non-circular opening formed in the bottom of the control member 30, In this way, the control member 30 and the ratchet 62 rotate together as a unit on the mounting bolt 38 that defines the third axis Z. Of course, it will be apparent from this disclosure that the control member 30 and the ratchet 62 can be fixed together in other ways. For example, the bottom of the control member 30 can be provided with one or more protrusions that engages the one or more corresponding openings in the ratchet 62. Alternatively, the control member 30 and the ratchet 62 could be a one-piece, unitary member.

The ratchet 62 has a plurality of first ratchet teeth 72, a plurality of second ratchet teeth 74 and a plurality of third ratchet teeth 76. The first ratchet teeth 72 are formed at a first location on the periphery (i.e., the outer peripheral edge) of the ratchet 62. The second ratchet teeth 74 are formed at a second location on the periphery of the ratchet 62. The third ratchet teeth 76 are disposed radially inside of the first and second ratchet teeth 72 and 74 with respect to the third axis Z of the control member 30. The first, second and third ratchet teeth 72, 74, and 76 are each arranged in an arc configuration. The first, second and third ratchet teeth 72, 74, and 76 are coaxially arranged on the ratchet 62 with respect to the third axis Z of the control member 30. The first and second ratchet teeth 72 and 74 are arranged opposite one another on the periphery of the ratchet 62. In other words, the first and second ratchet teeth 72 and 74 are arranged on opposite halves of the periphery of the ratchet 62.

Basically, the ratchet teeth 72 are selectively engaged by the positioning tooth 66 to hold the control member 30 and the ratchet 62 in a current shift position while the first and second user operating members 26 and 28 are in their rest positions. One the other hand, the second ratchet teeth 74 are selectively engaged by the maintaining tooth 68 to limited the movement amount of the control member 30 and the ratchet 62 in the first rotational direction R1 during actuation of the first user operating member 26 as seen in FIG. 11. In the illustrated embodiment, the control member 30 and the ratchet 62 can only rotate by an amount equal to the distance between two stop surfaces of two adjacent ones of the second ratchet teeth 74 as a result of actuation of the first user operating member 26.

Thus, only a single shift can be performed by actuation of the first user operating member 26 in a single continuous progressive movement from the rest position. The third ratchet teeth 76 are selectively engaged by the pull pawl 64 to rotate the control member 30 and the ratchet 62 in the second rotational direction R2 against the biasing force of the biasing element 42 upon the actuation of the second user operating member 28. Multiple shifts can be performed by actuation of the second user operating member 28 in a single continuous progressive movement from the rest position based upon the amount of angular movement of the second user operating member 28.

As seen in FIG. 3, the pull pawl 64 is pivotally mounted on the second user operating member 28. Thus, the pull pawl 64 moves with the second user operating member 28 as the second user operating member 28 pivots on the second axis Y. In the illustrated embodiment, a mounting plate 80 is mounted to the second user operating member 28 to pivotally retain the pull pawl 64 on the second user operating member 28. In the assembled condition, the pull pawl 64 extends through an arc-shaped opening 44a in the stationary support plate 44 to engage one of the third ratchet teeth 76 upon actuation of the second user operating member 28.

The pull pawl 64 is biased by a biasing element 82 (e.g., a torsion spring) towards an engagement position in which the pull pawl 64 engages one of the third ratchet teeth 76. However, with the second user operating member 28 in the rest position, the pull pawl 64 contacts an abutment 44b formed by the arc-shaped opening 44a in the stationary support plate 44.

Figure 7:
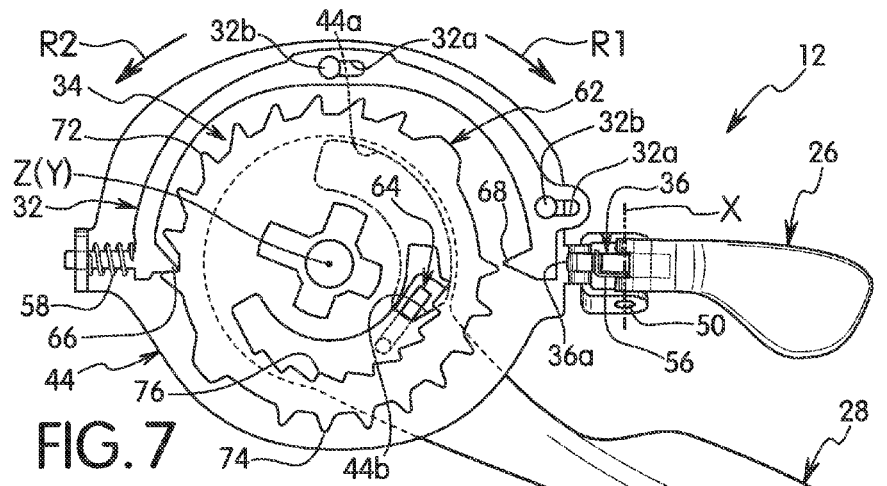
FIG. 7 is a top plan view of selected parts of the right bicycle shifter illustrated in FIGS. 1 to 3, showing the first and second operating members in their rest positions.
Figure 8:
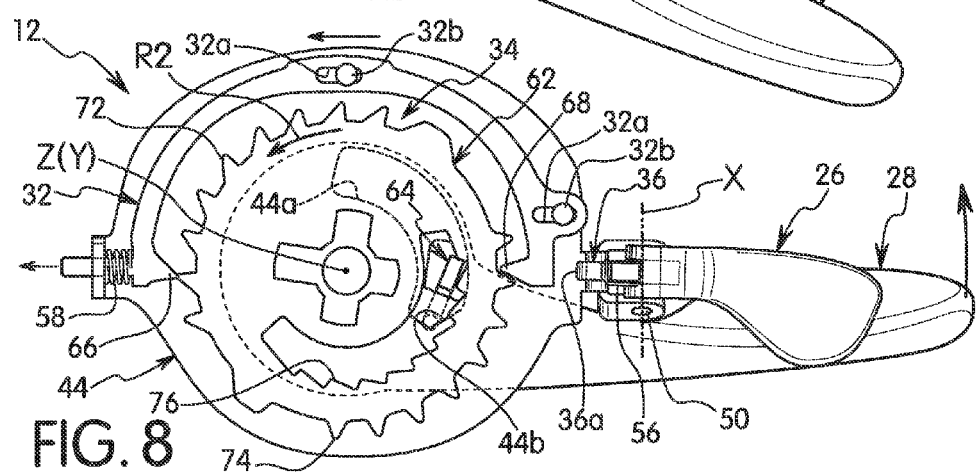
FIG. 8 is a top plan view of the selected parts of the right bicycle shifter illustrated in FIG. 7, showing the first operating member in the rest position and the second operating member moved to a non-rest position for performing a shifting (pulling) actuation.
Figure 9:
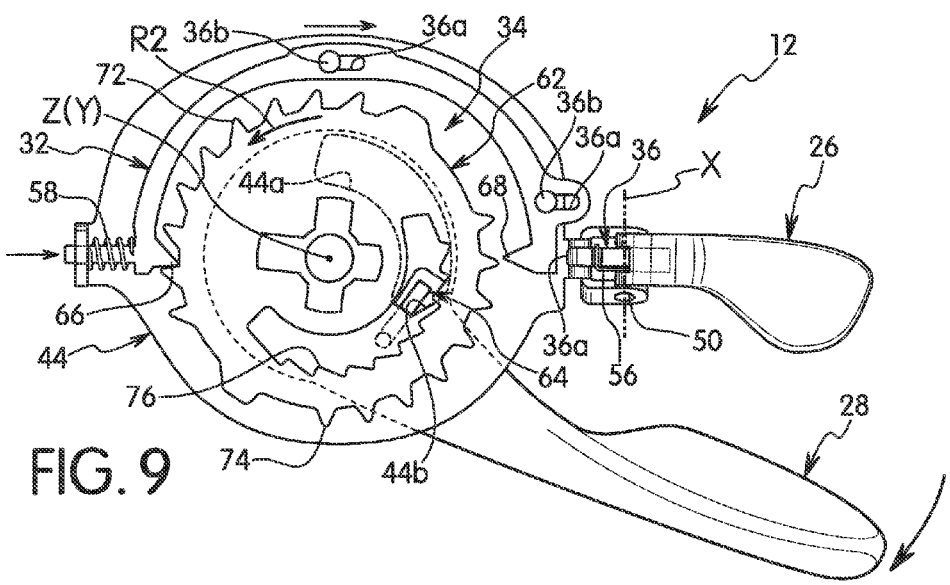
FIG. 9 is a top plan view of the selected parts of the right bicycle shifter illustrated in FIGS. 7 and 8, showing the second operating member returned to its rest position to complete the shifting (pulling) actuation that was started in FIG. 8.

In FIG. 4, the control member 30 is illustrated in a fully released position. in the fully released position, the positioning tooth 66 and the maintaining tooth 68 are both disengaged from the first and second ratchet teeth 72 and 74 of the ratchet 62. As seen in FIGS. 7 to 9, a pulling operation is performed by the actuation of the second user operating member 28 in which the pull pawl 64 engages one of the third ratchet teeth 76 of the ratchet 62 to rotate the control member 30 and the ratchet 62 in the second rotational direction R2. As the control member 30 rotates in the second rotational direction R2, the inner wire 16a wound on the peripheral edge of the control member 30, and thus pulled into the housing 20. During this rotation of the ratchet 62., as seen in FIG. 8, one of the first ratchet teeth 72 of the ratchet 62 engages the positioning tooth 66 to move the linearly moving member 32 from the first position (FIG. 7) to the second position (FIG. 8) such that the positioning tooth 66 moves into engagement with the next adjacent one of the first ratchet teeth 72. In particular, each of the first ratchet teeth 72 has a cam surface that is angled to temporarily move the positioning tooth 66 out of the path of the first ratchet teeth 72, Thus, the positioning tooth 66 together with the linearly moving member 32 functions as a ratchet pawl that ratchets over the first ratchet teeth 72 when the ratchet 62 rotates in the second rotational direction R2 so that the positioning tooth 66 can move into engagement with the next adjacent one of the first ratchet teeth 72. Each of the first ratchet teeth 72 also has a stop surface that is arranged to contact the positioning tooth 66 to hold the control member 30 and the ratchet 62 in a current shift position. With the illustrated embodiment, the control member 30 and the ratchet 62 can be rotated one shift position or multiple shift positions in a single continuous progressive movement of the second user operating member 28 from the rest position depending upon the amount of angular movement of the second user operating member 28.

As seen in FIGS. 10 to 12, a releasing operation is performed by the actuation of the first user operating member 26 in which the contact tooth 36a of the intermediate element 36 moves into contact with the linearly moving member 32 and then linearly moves (i.e., pushes) the linearly moving member 32 from the first position or rest position to the second position or actuated. position. This linear movement of the linearly moving member 32 from the first position to the second position results in the positioning tooth 66 being moved out of engagement from the first ratchet teeth 72, and results in the maintaining tooth 68 moving into the path of the second ratchet teeth 74. The disengagement of the positioning tooth 66 from the first ratchet teeth 72 results in the control member 30 and the ratchet 62 being released to rotation in the first rotational direction R1 due to the biasing force of the biasing element 42. As the control member 30 rotates in the first rotational direction R1, the inner wire 16a unwound from the peripheral edge of the control member 30, and thus released from the housing 20. However, since the maintaining tooth 68 has moved into the path of the second ratchet teeth 74, one of the second ratchet teeth 74 engages the maintaining tooth 68 to stop further rotation of the control member 30 and the ratchet 62 in the first rotational direction R1 against the biasing force of the biasing element 42. Once the user releases the first user operating member 26, the first user operating member 26 returns to its rest position due to the biasing force of the biasing element 52. This return movement of the first user operating member 26 causes the first user operating member 26 to pull the intermediate element 36 so that the contact tooth 36a of the intermediate element 36 moves out of contact with the linearly moving member 32. Thus, the linearly moving member 32 returns to the first position due to the biasing force of the biasing element 58. With the linearly moving member 32 in the first position (FIGS. 7, 9, 10 and 12), the positioning tooth 66 contacts one of the ratchet teeth 72. In this way, the control member 30 and the ratchet 62 are held in a current shift position. More specifically, the control member 30 and the ratchet 62 are biased against a stop surface of the currently engaged one of the first ratchet teeth 72 due to the biasing force of the biasing element 42.

Referring now to FIGS. 15 to 19, the bicycle shifter 12 is illustrated with a first modification in which the first user operating member 26, the linearly moving member 32 and the intermediate element 36 have been replaced with a modified first user operating member 126, a modified linearly moving member 132 and a modified intermediate element 136. All other parts of the bicycle shifter 12 remain unchanged in FIGS. 15 to 19.

In this first modification of the bicycle shifter 12, the intermediate element 136 includes a roller disposed between the first user operating member 126 and the linearly moving member 132. The intermediate element 136 (i.e., the roller) can be rotatably disposed on either of the linearly moving member 132 or the first user operating member 126 as needed and/or desired. In this first modification of the bicycle shifter 12, the intermediate element 1136 is rotatably disposed on the linearly moving member 132. Thus, to accommodate this first modification, the first user operating member 126 and the linearly moving member 132 have been modified relative to the first user operating member 26 and the linearly moving member 32 to cooperate with the intermediate element 136 (i.e., the roller).

The first user operating member 126 operates in the same way as the first user operating member 26, and includes a first user contact surface 126a, a first pivot arm 126b and an operating part 126c. The only difference between the first user operating member 126 and the first user operating member 26 is that the operating part 126c is shaped differently from the operating part 26c to cooperate with the intermediate element 136 (i.e., the roller).

The linearly moving member 132 operates in the same way as the linearly moving member 32, and includes a pair of pair of slots 132a for receiving the mounting pins 32b to control the linear movement of the linearly moving member 132 with respect to the stationary support plate 44. The linearly moving member 132 also includes a positioning tooth 166 and the maintaining tooth 168. Thus, in this first modification of the bicycle shifter 12, a transmission 134 is formed by the ratchet 62, the pull pawl 64, the positioning tooth 166 and the maintaining tooth 168. The operation of the linearly moving member 132 is the same as the linearly moving member 32. In other words, the linearly moving member 132 moves in response to actuation of the first and second user operating members 126 and 28 to operate the transmission 134 for performing shifting operations in the same manner as discussed above with respect to the transmission 34. The only difference between the linearly moving member 132 and the linearly moving member 32 is that the linearly moving member 132 has been modified to rotatably support the intermediate element 136 (i.e., the roller) via a pivot pin 154. Thus, the first modification of the bicycle shifter 12 will not be discussed in more detail herein.

Referring now to FIGS. 20 to 24, the bicycle shifter 12 is illustrated with a second modification in which the first user operating member 26, the linearly moving member 32 and the intermediate element 36 have been replaced with a modified first user operating member 226, a modified linearly moving member 232 and a modified intermediate element 236. All other parts of the bicycle shifter 12 remain unchanged in FIGS. 20 to 24.

In this second modification of the bicycle shifter 12, the intermediate element 236 includes a link member that is attached between the first user operating member 226 and the linearly moving member 232 such that they move together. To accommodate this second modification, the first user operating member 226 and the linearly moving member 232 have been modified relative to the first user operating member 26 and the linearly moving member 32 such that the first user operating member 226 and the linearly moving member 232 are pivotally coupled together by the intermediate element 236 (i.e., link member) for movement together.

The first user operating member 226 operates in the same way as the first user operating member 26, and includes a first user contact surface 226a, a first pivot arm 226b and an operating part 226c. The only difference between the first user operating member 226 and the first user operating member 26 is that the operating part 226c is shaped differently from the operating part 26c to be pivotally coupled to the intermediate element 236 (i.e., link member) via a pivot pin 251.

The linearly moving member 132 operates in the same way as the linearly moving member 32, and includes a pair of pair of slots 232a for receiving the mounting pins 32b to control the linear movement of the linearly moving member 232 with respect to the stationary support plate 44. The linearly moving member 232 also includes a positioning tooth 266 and the maintaining tooth 268. Thus, in this second modification of the bicycle shifter 12, a transmission 234 is formed by the ratchet 62, the pull pawl 64, the positioning tooth 266 and the maintaining tooth 268. The operation of the linearly moving member 232 is the same as the linearly moving member 32. In other words, the linearly moving member 232 moves in response to actuation of the first and second user operating members 226 and 28 to operate the transmission 234 for performing shifting operations in the same manner as discussed above with respect to the transmission 34. The only difference between the linearly moving member 232 and the linearly moving member 32 is that the linearly moving member 232 has been modified to pivotally support one end of the intermediate element 236 (i.e., the link member) via a pivot pin 254. Thus, the second modification of the bicycle shifter 12 will not be discussed in more detail herein.

Referring now to FIGS. 25 to 29, the bicycle shifter 12 is illustrated with a third modification in which the first user operating member 26, the linearly moving member 32 and the intermediate element 36 have been replaced with a modified first user operating member 326, a modified linearly moving member 332 and a modified intermediate element 336. To accommodate this third modification, the stationary support plate 44 has also been replaced with a modified stationary support plate 344 to support the intermediate element 336. All other parts of the bicycle shifter 12 remain unchanged in FIGS. 25 to 29.

In this third modification of the bicycle shifter 12, the intermediate element 336 includes a biasing member (e.g., a torsion spring) that is mounted on the stationary support plate 344 by a support pin 351. The intermediate element 336 (e.g., the biasing member) has a first end connected to the linearly moving member 32 and a second end engaged with the edge of the stationary support plate 344 to bias the linearly moving member 32 toward the first position. To accommodate this third modification, the first user operating member 326 and the linearly moving member 332 have been modified relative to the first user operating member 26 and the linearly moving member 32 to cooperate with the intermediate element 336 (i.e., the biasing member). Here, the stationary support plate 344 is identical to the stationary support plate 44, except for a hole has been added for attachment of the support pin 351 that supports the intermediate element 336 (i.e., the biasing member) on the stationary support plate 344.

The first user operating member 326 operates in the same way as the first user operating member 26, and includes a first user contact surface 326a, a first pivot arm 326b and an operating part 326c. The only difference between the first user operating member 326 and the first user operating member 26 is that the operating part 326c is shaped differently from the operating part 26c to cooperate with the intermediate element 336 (i.e., the biasing member).

The linearly moving member 332 operates in the same way as the linearly moving member 32, and includes a pair of pair of slots 332a for receiving the mounting pins 32b to control the linear movement of the linearly moving member 332 with respect to the stationary support plate 344. The linearly moving member 332 also includes a positioning tooth 366 and the maintaining tooth 368. Thus, in this third modification of the bicycle shifter 12, a transmission 334 is formed by the ratchet 62, the pull pawl 64, the positioning tooth 366 and the maintaining tooth 368. The operation of the linearly moving member 332 is the same as the linearly moving member 32. In other words, the linearly moving member 332 moves in response to actuation of the first and second user operating members 326 and 28 to operate the transmission 334 for performing shifting operations in the same manner as discussed above with respect to the transmission 34. The only difference between the linearly moving member 332 and the linearly moving member 32 is that the linearly moving member 332 has been modified with a hole such that the first end of the intermediate element 336 (e.g., the biasing member) is connected thereto. Thus, the third modification of the bicycle shifter 12 will not be discussed in more detail herein.

Referring now to FIGS. 30 to 32, the bicycle shifter 12 is illustrated with a fourth modification in which the linearly moving member 32 has been replaced with a modified linearly moving member 432, a separate positioning tooth 466 and a separate maintaining tooth 468. To accommodate this fourth modification, the stationary support plate 44 has been replaced with a modified stationary support plate 444 to support the linearly moving member 432, the positioning tooth 466 and the maintaining tooth 468. All other parts of the bicycle shifter 12 remain unchanged in FIGS. 30 to 32.

In this fourth modification of the bicycle shifter 12, the positioning tooth 466 and the maintaining tooth 468 are pivotally mounted to the stationary support plate 444. Thus, in this fourth modification of the bicycle shifter 12, a transmission 434 is formed by the ratchet 62, the pull pawl 64, the positioning tooth 466 and the maintaining tooth 468. Also to accommodate this fourth modification, the stationary support plate 444 has been provided with a pair of holes for fixedly attaching pins that pivotally support the positioning tooth 466 and the maintaining tooth 468 on the stationary support plate 444. Also, the shape of the support plate 444 has been modified and a spring end receiving hole has been added to accommodate the positioning tooth 466 and the maintaining tooth 468. Otherwise, the stationary support plate 444 is identical to the stationary support plate 44.

The linearly moving member 432 operates in the same way as the linearly moving member 32, and includes a pair of pair of slots 432a for receiving the mounting pins 32b to control the linear movement of the linearly moving member 432 with respect to the stationary support plate 444. However, in this fourth modification of the bicycle shifter 12, the linearly moving member 432 moves (i.e., pivots) the positioning tooth 466 and the maintaining tooth 468 in response to actuation of the first and second user operating members 26 and 28.

In this fourth modification of the bicycle shifter 12, a biasing element 458a (e.g., a torsion spring) is operatively disposed between the stationary support plate 444 and the positioning tooth 466 to bias the positioning tooth 466 towards a disengagement position with respect to the first ratchet teeth 72. In particular, a first end of the biasing element 458a is disposed in the spring end receiving hole of the stationary support plate 444 and a second end of the biasing element 458a is hooked onto the positioning tooth 466 to bias the positioning tooth 466 towards a disengagement position with respect to the first ratchet teeth 72. In the case of the maintaining tooth 468, a biasing element 458b (e.g., a torsion spring) biases the maintaining tooth 468 towards a disengagement position with respect to the second ratchet teeth 74. In particular, a first end of the biasing element 458b is hooked onto the edge of the stationary support plate 444 and a second end of the biasing element 458b is hooked onto the maintaining tooth 468 to bias the maintaining tooth 468 towards a disengagement position with respect to the second ratchet teeth 74. Of course, the combined biasing force of the biasing elements 58 and 458b is greater than the biasing force of the biasing element 458b such that the linearly moving member 432 is normally held in the first position or rest position as seen in FIGS. 30 and 32. The operations of the linearly moving member 432, the positioning tooth 466 and the maintaining tooth 468 to operate the transmission 434 for performing shifting operations are the same as the linearly moving member 32, the positioning tooth 66 and the maintaining tooth 68, which are discussed above. Thus, the fourth modification of the bicycle shifter 12 will not be discussed in more detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle operating device. Accordingly, these terms, as utilized to describe the bicycle operating device should be interpreted relative to a bicycle equipped with the bicycle operating device as used in the normal riding position on level ground. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle operating device comprising:
a housing;
a control member rotatably disposed on the housing about an axis for controlling a control cable;
a linearly moving member movably disposed on the housing for linear displacement between a first position and a second position;
a transmission operatively coupled between the linearly moving member and the control member, the transmission converting the linear displacement of the linearly moving member from the first position to the second position into a rotation of the control member toward a first rotational direction about the axis;
a user operating member movably mounted to the housing between a rest position and an actuated position, and
an intermediate element disposed between the linearly moving member and the user operating member, the intermediate element includin a pivoting member that is disposed on the user operating member, and the intermediate element being movably mounted relative to the linearly moving member and the user operating member to transmit a movement of the user operating member to the linearly moving member for moving the linearly moving member from the first position to the second position upon movement of the user operating member from the rest position to the actuated position.

2. The bicycle operating device according to claim 1, wherein
the pivoting member has a contact tooth that temporally contacts the linearly moving member during movement of the linearly moving member from the first position to the second position.

3. The bicycle operating device according to claim 1, wherein
the transmission includes a plurality of ratchet teeth and a positioning tooth, the positioning tooth selectively contacting one of the ratchet teeth while the linearly moving member is disposed at the first position.

4. The bicycle operating device according to claim 1, wherein
the transmission includes a plurality of ratchet teeth and a maintaining tooth, the maintaining tooth selectively contacting one of the ratchet teeth while the linearly moving member is disposed at the second position.

5. The bicycle operating device according to claim 4, wherein
the transmission further includes a positioning tooth, the positioning tooth selectively contacting one of the ratchet teeth while the linearly moving member is disposed at the first position.

6. The bicycle operating device according to claim 5, wherein
the maintaining tooth and the positioning tooth are integrally provided on the linearly moving member.

7. The bicycle operating device according to claim 1, further comprises
a second user operating member movably mounted to the housing and operatively coupled to the control member to rotate the control member about the axis toward a second rotational direction which is opposite to the first rotational direction.

* * * * *